United States Patent [19]

Chang

[11] Patent Number: 5,326,653
[45] Date of Patent: Jul. 5, 1994

[54] BATTERY UNIT WITH REINFORCED CURRENT COLLECTOR TABS AND METHOD OF MAKING A BATTERY UNIT HAVING STRENGTHENED CURRENT COLLECTOR TABS

[75] Inventor: On-Kok Chang, San Jose, Calif.

[73] Assignee: Valence Technology, Inc., San Jose, Calif.

[21] Appl. No.: 968,173

[22] Filed: Oct. 29, 1992

[51] Int. Cl.$^5$ .................................................. H01M 2/30
[52] U.S. Cl. ........................................ 429/162; 429/163; 429/181
[58] Field of Search ............... 429/121, 123, 163, 208, 429/162, 181

[56] References Cited

U.S. PATENT DOCUMENTS

| | | |
|---|---|---|
| 4,085,253 | 4/1978 | Johnson .................................... 429/1 |
| 4,086,399 | 4/1978 | Hyland et al. ...................... 429/122 |
| 4,393,125 | 7/1983 | Skarstad et al. .................... 429/105 |
| 4,664,994 | 5/1987 | Koike et al. ........................ 429/163 |
| 4,830,939 | 5/1989 | Lee et al. ............................ 429/191 |
| 4,925,751 | 5/1990 | Shackle et al. ..................... 429/192 |
| 5,135,821 | 8/1992 | Takemura et al. ................... 429/65 |

Primary Examiner—Mukund J. Shah
Assistant Examiner—Matthew V. Grumbling
Attorney, Agent, or Firm—Harold R. Brown

[57] ABSTRACT

A battery unit includes a battery having an anode including an anode current collector tab, a cathode including a cathode current collector tab, and an electrolyte disposed between the anode and the cathode. The battery is sealed by packaging material such that portions of the anode current collector tab and the cathode current collector tab extend past the exterior of the packaging material. The extended portions of the anode current collector tab and the cathode current collector tab are secured to the exterior of the packaging material to reinforce the extended portions.

16 Claims, 2 Drawing Sheets

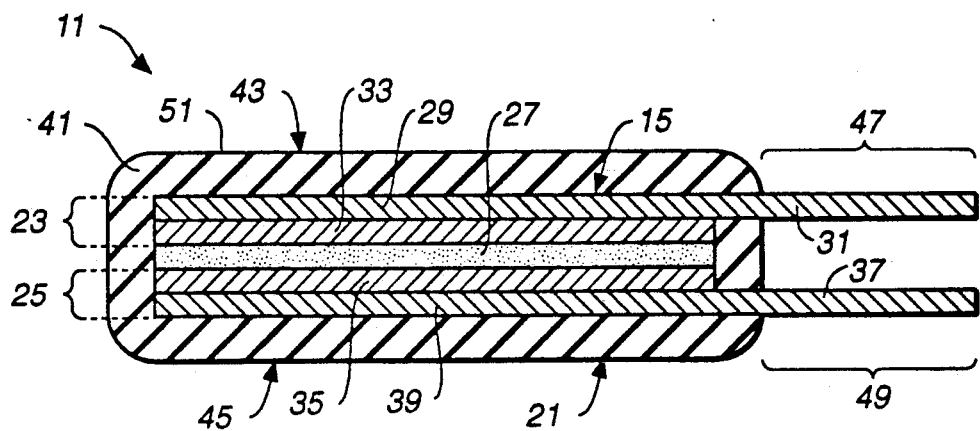
FIG._1
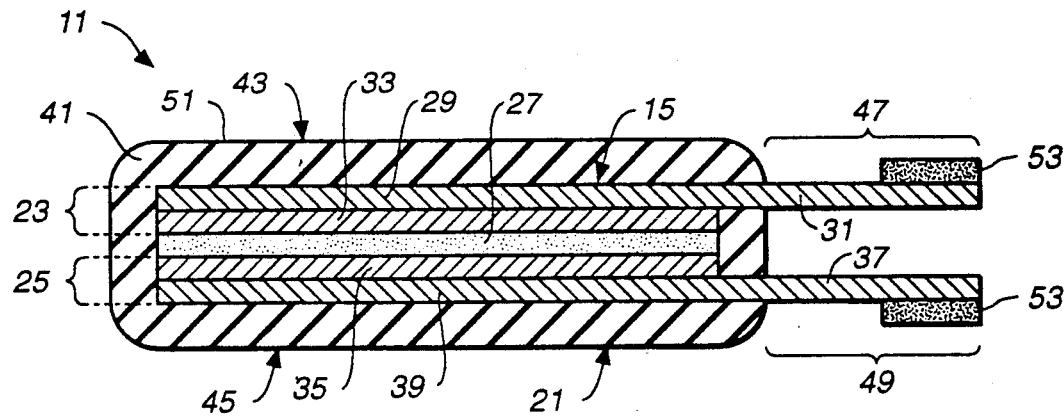
FIG._2
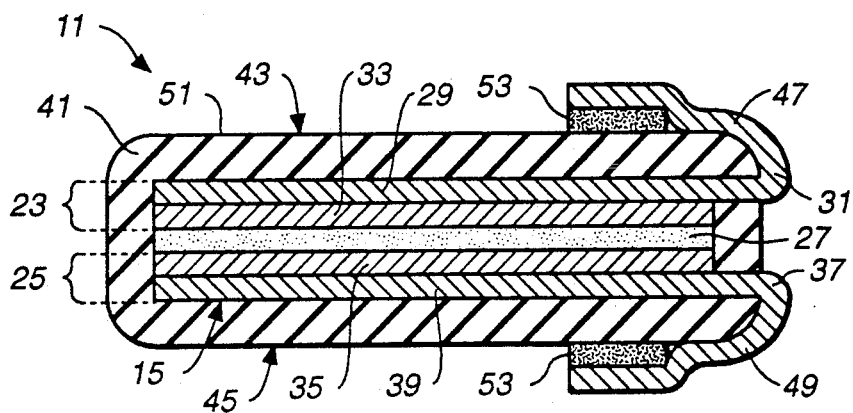
FIG._3

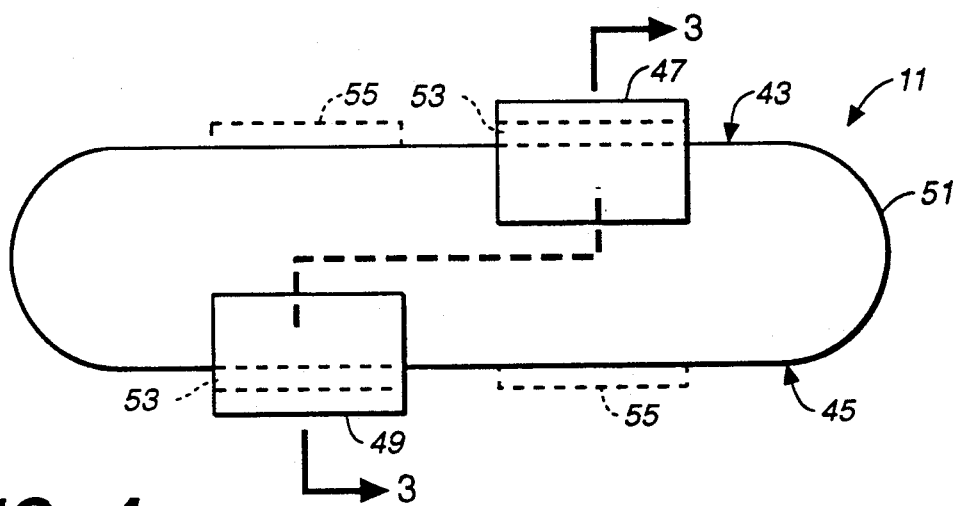
FIG._4
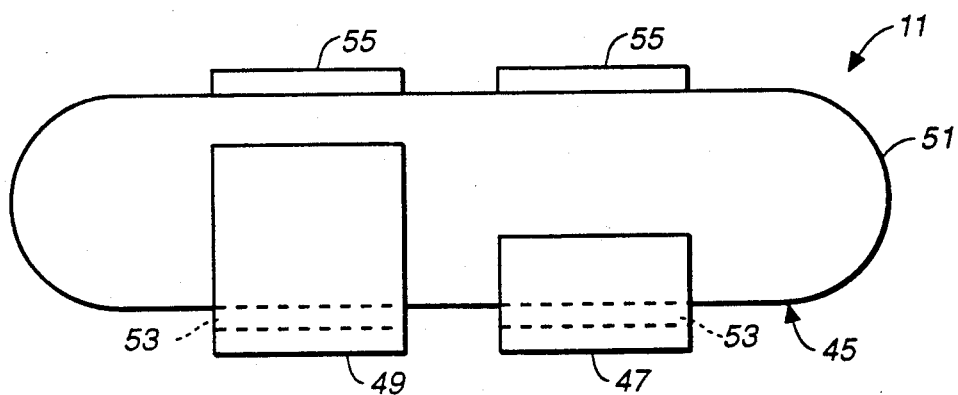
FIG._5
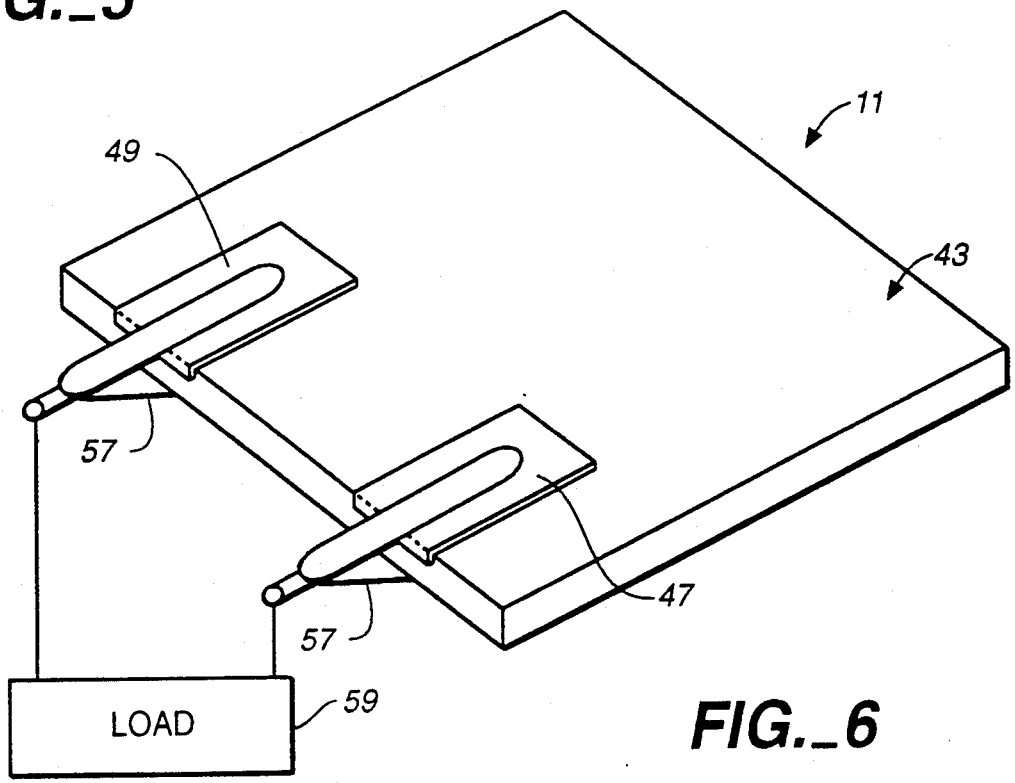
FIG._6

BATTERY UNIT WITH REINFORCED CURRENT COLLECTOR TABS AND METHOD OF MAKING A BATTERY UNIT HAVING STRENGTHENED CURRENT COLLECTOR TABS

BACKGROUND OF THE INVENTION

1. Field of the Invention

The present invention relates to batteries and, more particularly, to batteries including current collecting tabs.

2. State of the Art

In recent years, workers in the battery art have begun to understand the advantages of manufacturing batteries that have polymer electrolytes and sheet-like anodes and cathodes. The advantages of such so-called "thin package" batteries include lower battery weight than comparably-sized batteries that employ liquid electrolytes, longer service life, relatively high power densities, relatively high specific energies, and the elimination of danger due to the spillage of acidic liquid electrolytes.

Anode and cathode materials used in such batteries may be poor conductors of electricity. Thus, in fabricating such batteries, it is generally necessary to connect an anode to an anode current collector and a cathode to a cathode current collector so that electric energy can be efficiently drawn from the battery by an external load. In most of these batteries, current collectors are electrically connected to each anode and each cathode. Because it is generally an objective, in designing such batteries, to make a small, light-weight, yet powerful battery, it is desirable to keep the size and weight of the current collectors to a minimum. The small, light-weight current collectors are generally electrically connected to external loads by known electrical connectors. Often, connections formed with connectors such as alligator clips and the like damage the current collectors and result in poor performance of the battery. It is desirable, therefore, to provide a battery unit having a strong current collector arrangement.

SUMMARY OF THE PRESENT INVENTION

The present invention, generally speaking, provides a battery unit including a reinforced current collector arrangement.

In accordance with one aspect of the present invention, a battery unit includes a battery, the battery having an anode including an anode current collector tab, a cathode including a cathode current collector tab, and an electrolyte disposed between the anode and the cathode. Packaging material surrounds the battery to form a package having top and bottom sides. At least a portion of the anode current collector tab and at least a portion of the cathode current collector tab extend past an exterior surface of the packaging material. The extended portions of the anode current collector tab and the cathode current collector tab are secured to the exterior surface of the packaging material on at least one of the top and bottom sides of the package.

In accordance with another aspect of the present invention, a method of making a battery unit includes the steps of attaching together an anode including an anode current collector tab, an electrolyte, and a cathode including a cathode current collector tab, such that the electrolyte is disposed between the anode and the cathode, thereby forming a battery. The battery is surrounded with a packaging material to form a package having a top and a bottom side. At least a portion of the anode current collector tab and at least a portion of the cathode current collector tab extend past the exterior of the packaging material. The anode current collector tab and the cathode current collector tab are secured to the exterior of the packaging material on at least one of the top and bottom sides of the package.

BRIEF DESCRIPTION OF THE DRAWINGS

The present invention can be further understood with reference to the following description in conjunction with the appended drawings, wherein like elements are provided with the same reference numerals. In the drawings:

FIGS. 1, 2, and 3 are schematic, cross-sectional side views illustrating a method of reinforcing current collector tabs on a battery unit according to an embodiment of the present invention, FIG. 3 being taken at section 3—3 of FIG. 4;

FIG. 4 is a schematic, front elevational view of a battery unit according to an embodiment of the present invention;

FIG. 5 is a schematic, front elevational view of a battery unit according to an embodiment of the present invention; and FIG. 6 is a schematic, perspective view of a battery unit according to an embodiment of the present invention.

DETAILED DESCRIPTION OF THE PREFERRED EMBODIMENT

As shown in FIGS. 1-3, a battery unit 11 includes an anode 23, a cathode 25, and an electrolyte 27 disposed between the anode and the cathode. The anode 23, the cathode 25, and the electrolyte, together, form a battery 15. In the illustrated embodiment, the anode 23 includes a sheet-like anode current collector 29, the anode current collector being formed with at least one anode current collector tab 31 extending from an edge of the anode current collector, and anode material 33 disposed on at least one side of the anode current collector. The cathode 25 includes a sheet-like cathode current collector 35, the cathode current collector being formed with at least one cathode current collector tab 37 extending from an edge of the cathode current collector, and cathode material 39 disposed on at least one side of the cathode current collector. The electrolyte 27 is disposed between the anode material 33 and the cathode material 39 and is preferably a polymer electrolyte.

The anode current collector 29 and the cathode current collector 35 are preferably formed from conductive web or sheet-like materials, the web or sheet-like materials preferably having a thickness of approximately 0.001". In a presently preferred embodiment, the anode current collector 29 and the cathode current collector 35 are formed from nickel or copper webs or sheets. U.S. Pat. No. 4,925,751 to Shackle et al. describes certain anode, cathode, and polymer electrolyte materials useful in forming the battery unit 11 and is incorporated by reference only to the extent that it describes such materials. While only a single cell battery 15 is shown in FIGS. 1-3, it will be appreciated that many repeating layers of anodes 23, cathodes 25, and electrolytes 27 can be stacked on top of one another to achieve desired power characteristics in a battery.

The battery 15 including the anode 23, the cathode 25, and the electrolyte 27 is surrounded by insulative packaging material 41 to form a thin package 21 having a top surface 43 and a bottom surface 45. The anode material 33 preferably includes lithium, because of its position in the electromotive series, and the packaging material 41 sealing the battery components prevents damage to the battery 15 due, for example, to exposure of the anode material to moisture. Portions 47, 49 of the anode current collector tab 31 and the cathode current collector tab 37, respectively, extend past the exterior 51 of the packaging material to facilitate forming an electrical connection with an external load. Presently preferred packaging materials 41 include moisture-impermeable plastic sheets that are sealed around the battery components by means of an adhesive or by shrink-wrapping.

As shown in FIGS. 2 and 3, means 53 are provided for securing the extended portions 47, 49 of the anode current collector tab 31 and the cathode current collector tab 37 to one of the top and bottom surfaces 43, 45 of the package 21 on the exterior 51 of the packaging material such that the secured extended portions are reinforced and strengthened. The securing means 53 secures the extended portions 47, 49 of the anode current collector tab 31 and the cathode current collector tab 37 to the exterior 51 of the packaging material 41 such that, as shown in FIG. 6, at least a portion of the extended portions secured to the packaging material are connectable to an external load 59 by known electrical connection means 57. The extended portions 47, 49 of the anode current collector tab 31 and the cathode current collector tab 37 are preferably folded back, as shown in FIG. 3, relative to the package 21, to secure the extended portions to the exterior 51 of the packaging material 41. The extended portions 47, 49 are bent around a sufficiently large radius, and are formed of a sufficiently flexible, bendable material, such that the extended portions are not damaged when they are bent.

As shown in FIG. 4, the extended portion 47 of the anode current collector tab 31 and the extended portion 49 of the cathode current collector tab 37 are preferably folded relative to the exterior 51 of the package 21 such that the extended portion of the anode current collector tab is secured to the top surface 43 of the package and the cathode current collector tab is secured to the bottom surface 45. If desired, however, the extended portions 47, 49 of the anode current collector tab 31 and the cathode current collector tab 37 may be folded in the same direction such that the extended portions are secured to only one of the top or the bottom surfaces 43, 45 of the package 21, as shown in FIG. 5.

As shown in FIGS. 4 and 5, the anode and cathode current collector tabs 31 and 37 preferably extend past the exterior 51 of the packaging material 41 at different points such that the extended portions 47, 49 are not disposed close enough to one another to inadvertently contact one another. The extended portions 47, 49 of the anode current collector tab 31 and the cathode current collector tab 37 preferably extend from the same side of the package 21. However, if desired, the extended portions 47, 49 may extend from different sides of the package 21.

As shown in FIGS. 2 and 3, the securing means 53 preferably includes a small piece of double-sided, electrically insulative tape adhering, on one side of the tape, to one side of the extended portions 47, 49 of the anode current collector tab 31 and the cathode current collector tab 37 and, as shown in FIG. 3, on the other side of the tape, to the exterior 51 of the top or bottom surfaces 43, 45 of the packaging material 41. Other securing means 53 may include, for example, known adhesive materials.

As shown in FIG. 5, the battery unit 11 is preferably further provided with cushioning means 55 for cushioning the battery unit when certain types of electrical connection means 57 (FIG. 6) are used to electrically connect the battery unit to the extended portions 47, 49 of the anode current collector tab 31 and the cathode current collector tab 37 to external loads. The cushioning means 55 are secured to the exterior surface 51 of the package 21 on the opposite sides 43, 45 of the package from the securement of the extended portions 47, 49 of the anode current collector tab 31 and the cathode current collector tab 37 are secured. When electrical connection means 57 such as known alligator clips, as shown in FIG. 6, are used to form electrical connections between the battery unit 11 and an external load 59, the connection means may be to indelicate for the battery unit and may, in certain instances, cause damage to the battery or to the extended portions 47, 49 of the anode current collector tab 31 and the cathode current collector tab. The cushioning means 55 facilitates using electrical connection means 57 of the type that connect by compressively gripping the object to be connected in that the cushioning means prevents the electrical connection means from accidently deforming the battery unit or tearing through the packaging material 41 on the side opposite from the securement of the extended portions 47, 49. The cushioning means 55 is preferably formed of one or more layers of an insulative tape.

The battery unit 11 is made by attaching together the anode 23 including the anode current collector tab 31, the electrolyte 27, and the cathode 25 including the cathode current collector tab 37, such that the electrolyte is disposed between the anode and the cathode, the layered anode, electrolyte, and cathode thereby forming the battery 15. In accordance with a presently preferred embodiment, the anode material 33 (usually lithium) is deposited on the anode current collector tab 31 by a chemical-vapor deposition process. The anode material 33 may, however, be applied, in the form of a thin sheet, to the anode current collector tab 31. In accordance with a presently preferred embodiment, the cathode material 39 is coated on the cathode current collector 35 by extruding cathode material onto a web of material for forming the cathode current collector and rolling the cathode material to a uniform thickness on the cathode current collector. In accordance with a presently preferred embodiment, the electrolyte 27 is applied on top of a uniform thickness layer of cathode material 39 on the cathode current collector 35 by, e.g., a doctor blade assembly.

The battery 15 is sealed with packaging material 41, such that it is moisture-impermeable, to form the package 21 having the top surface 43 and the bottom surface 45. The packaging material 41 is preferably sealed around the battery 15 with an adhesive (not shown) for sealing edges of the packaging material together. However, the packaging material 41 may be shrink-wrap material and may be seal the battery 15 by being shrunk around the battery. The extended portion 47 of the anode current collector tab 31 and the extended portion 49 of the cathode current collector tab 37 extend past the exterior 51 of the packaging material 41. As shown in FIGS. 2 and 3, the extended portion 47 of the anode current collector tab 31 and the extended portion 49 of the cathode current collector tab 37 are secured to the exterior 51 of the packaging material 41 on at least one of the top and bottom surfaces 43, 45 of the package 21. The extended portions 47, 49 are folded around a sufficiently large radius and are formed of a sufficiently bendable and flexible material such that they are not damaged when being folded back to be secured to the exterior 51 of the packaging material. Preferably, the extended portions 47, 49 are sufficiently bendable and flexible that they fold around thin packaging material 41 without being damaged.

The anode current collector tab 31 and the cathode current collector tab 37 are secured to the exterior 51 of the packaging material 41 with securing means 53 such as an adhesive or double-sided tape. If desired, the extended portions 47, 49 of the anode current collector tab 31 and the cathode current collector tab 37 may be attached to the same or to opposite ones of the top and bottom surfaces 43, 45 of the package 21.

Cushioning means 55 may be secured on the top and bottom surfaces 43, 45 the battery unit 11 opposite to the securement of the extended portion 47 of the anode current collector tab 31 and the extended portion 49 of the cathode current collector tab 37. The cushioning means 55 preferably are formed from insulative tape of sufficient integrity to withstand clamping forces from means for forming an electrical connection 57 with the battery unit 11. Means for forming an electrical connection 57 to the anode current collector tab 31 and the cathode current collector tab 37 are attached to the extended portions 47, 49. Preferably, the electrical connection means 57, such as alligator clips, grip the battery unit 11 around the cushioning means 55 and the extended portions 47, 49 of the anode current collector tab 31 and the cathode current collector tab 37.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A battery unit, comprising:
   a battery having an anode including an anode current collector tab, a cathode including a cathode current collector tab, and an electrolyte disposed between the anode and the cathode;
   packaging material surrounding the battery to form a package having top and bottom sides, at least a portion of the anode current collector tab and at least a portion of the cathode current collector tab extending past an exterior surface of the packaging material;
   the extended portions of the anode current collector tab and the cathode current collector tab being secured to the exterior surface of the packaging material on at least one of the top and bottom sides of the package.

2. The battery unit as set forth in claim 1, wherein the packaging material surrounds the battery such that the battery is sealed and is moisture-proof.

3. The battery unit as set forth in claim 1, wherein the anode current collector tab and the cathode current collector tab are secured to the exterior surface of the packaging material by an adhesive.

4. The battery unit as set forth in claim 1, wherein the anode current collector tab and the cathode current collector tab are secured to the exterior surface of the packaging material by double-sided tape.

5. The battery unit as set forth in claim 1, wherein the anode current collector tab and the cathode current collector tab are secured to the exterior surface of the packaging material on the same side of the package.

6. A battery unit, comprising:
   a battery having an anode including an anode current collector tab, a cathode including a cathode current collector tab, and an electrolyte disposed between the anode and the cathode;
   packaging material surrounding the battery to form a package having top and bottom sides, at least a portion of the anode current collector tab and at least a portion of the cathode current collector tab extending past an exterior surface of the packaging material;
   the extended portions of the anode current collector tab and the cathode current collector tab being secured to the exterior surface of the packaging material on at least one of the top and bottom sides of the package; and
   cushioning means secured on sides of the package opposite from the securement of the anode current collector tab and the cathode current collector tab.

7. The battery unit as set forth in claim 6, wherein the cushioning means includes insulating tape.

8. The battery unit as set forth in claim 1, further comprising means for forming an electrical connection attached to the anode current collector and the cathode current collector.

9. The battery unit as set forth in claim 8, wherein the electrical connection means includes an alligator clip.

10. A method of making a battery unit, comprising the steps of:
    attaching together an anode including an anode current collector tab, an electrolyte, and a cathode including a cathode current collector tab, such that the electrolyte is disposed between the anode and the cathode, thereby forming a battery;
    surrounding the battery with a packaging material to form a package having a top and a bottom side, at least a portion of the anode current collector tab and at least a portion of the cathode current collector tab extending past the exterior of the packaging material;
    securing the anode current collector tab and the cathode current collector tab to the exterior of the packaging material on at least one of the top and bottom sides of the package.

11. The method according to claim 10, wherein the battery is surrounded by the packaging material such that the battery is sealed and moisture-proof.

12. The method according to claim 10, wherein the anode current collector tab and the cathode current collector tab are secured to the exterior of the packaging material with an adhesive.

13. The method according to claim 10, wherein the anode current collector tab and the cathode current collector tab are secured to the exterior of the packaging material with a double-side tape.

14. The method according to claim 10, wherein the anode current collector tab and the cathode current collector tab are secured to the exterior surface of the packaging material on the same side of the package.

15. A method of making a battery unit, comprising the steps of:

attaching together an anode including an anode current collector tab, an electrolyte, and a cathode including a cathode current collector tab, such that the electrolyte is disposed between the anode and the cathode, thereby forming a battery;

surrounding the battery with a packaging material to form a package having a top and a bottom side, at least a portion of the anode current collector tab and at least a portion of the cathode current collector tab extending past the exterior of the packaging material;

securing the anode current collector tab and the cathode current collector tab to the exterior of the packaging material on at least one of the top and bottom sides of the package; and securing cushioning means on sides of the battery unit opposite from the securement of the anode current collector tab and the cathode current collector tab.

16. The method according to claim 10, comprising the further step of attaching means for forming an electrical connection to the anode current collector tab and the cathode current collector tab.

* * * * *